FIG.1

○ Boron

◍ Carbon o Hydrogen on Carbon
(Hydrogen atoms on boron omitted for clarity)

FIG. 2

○ Boron

◍ Carbon o Hydrogen on Carbon
(Hydrogen atoms on boron
omitted for clarity)

Aug. 26, 1969  J. W. AGER, JR., ET AL  3,463,820
REACTION PRODUCTS OF DECABORANE AND ACETYLENES
AND THEIR PREPARATION
Filed May 13, 1959                           3 Sheets-Sheet 3

FIG. 3

○ Boron

◉ Carbon

∘ Hydrogen on Carbon
(Hydrogen atoms on boron
omitted for clarity)

INVENTORS
JOHN W. AGER, JR.
THEODORE L. HEYING
BY DONALD J. MANGOLD

Adams, Forward and McLean

ATTORNEYS

United States Patent Office 3,463,820
Patented Aug. 26, 1969

3,463,820
REACTION PRODUCTS OF DECABORANE AND ACETYLENES AND THEIR PREPARATION
John W. Ager, Jr., Buffalo, Theodore L. Heying, Tonawanda, and Donald J. Mangold, Youngstown, N.Y., assignors to Olin Mathieson Chemical Corporation, a corporation of Virginia
Continuation-in-part of application Ser. No. 741,976, June 13, 1958. This application May 13, 1959, Ser. No. 813,032
Int. Cl. C06d 5/06, 5/10; C07f 5/02
U.S. Cl. 260—606.5
42 Claims

ABSTRACT OF THE DISCLOSURE

This invention relates to organoboron compounds and to a method for their preparation. The organoboron compounds are prepared by the reaction of decaborane or an alkylated decaborane having 1 to 2 alkyl groups containing 1 to 5 carbon atoms in each group with an acetylenic hydrocarbon containing from two to ten carbon atoms. The reaction products prepared by the method of this invention can be either solid or liquid and are useful as fuels.

---

This application is a continuation-in-part of our copending application Ser. No. 741,976, filed June 13, 1958, and now abandoned.

The preparation of decaborane is known in the art. Lower alkyl decaboranes such as monomethyldecarborane, dimethyldecarborane, monoethyldecaborane, diethyldecaborane, monopropyldecaborane and the like, can be prepared, for example, according to the method described in application Ser. No. 497,407, filed Mar. 28, 1955, by Elmar R. Altwicker, Alfred B. Garrett, Samuel W. Harris, and Earl A. Weilmuenster and issued as U.S. Patent No. 2,999,117 on Sept. 5, 1961.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The liquid products of this invention can be used as fuels according to the method described in application Ser. No. 497,407. A major advantage of these new liquid products is the high stability they exhibit at elevated temperatures. One of the shortcomings of many high energy fuels is their limited stability at the high temperatures sometimes encountered in their use. The liquid products of this invention, however, exhibit relatively little decomposition even after having been maintained at 500° or 750° F. for periods of twenty-four hours and more, thus rendering them well suited for more extreme conditions of storage and use. The liquid products of this invention are also of high density.

In accordance with this invention, it was discovered that decaborane or alkylated decaboranes having 1 to 2 alkyl groups containing 1 to 5 carbon atoms in each group will react with an acetylenic hydrocarbon containing from two to ten carbon atoms in the presence of any of a wide variety of ethers, nitriles, amines or sulfides. Suitable ethers include dimethyl ether, methyl ethyl ether, diethyl ether, di-n-propyl ether, diisopropyl ether, ethyl n-butyl ether, di-n-butyl ether, ethylene glycol dimethyl ether, dioxane, anisole and tetrahydrofuran. Suitable nitriles include hydrogen cyanide, acetonitrile, propionitrile, butyronitrile, isobutyronitrile, dimethyl propionitrile, valeronitrile, acrylonitrile, 3-butenenitrile, 4-pentenenitrile, succinonitrile, malononitrile, adiponitrile and B,B'-oxydipropionitrile. Suitable amines include methylamine, ethylamine, n-propylamine, isopropylamine, 2-aminopentane, tert-amylamine, dimethylamine, diethylamine, di-n-propylamine, di-sec-butylamine, methylethylamine, trimethylamine, triethylamine, ethylenediamine, propylenediamine, 1,3-diaminobutane, hexamethylenediamine, and octamethylenediamine. Suitable sulfides include dimethyl sulfide, diethyl sulfide, ethyl methyl sulfide, diisopropyl sulfide, ethyl propyl sulfide, di-n-butyl sulfide and diphenyl sulfide.

The ratio of reactants can be varied widely, generally being in the range of 0.05 to 20 moles of decaborane or alkyldecaborane per mole of acetylenic compound and preferably in the range of 0.5 to 5 moles of decaborane or alkyldecaborane per mole of acetylenic compound. The ratio of ether, nitrile, amine or sulfide to borane also can be varied widely, generally being in the range of 0.001 to 100 moles of ether, nitrile, amine or sulfide per mole of decaborane or alkyldecaborane, and preferably being in the range of 0.2 to 20 moles of ether, nitrile, amine or sulfide per mole of decaborane or alkyldecaborane. The reaction temperature can vary widely, generally from 25° C. to 180° C. and preferably between 50° C. and 155° C. The reaction pressure can vary from subatmospheric to several atmospheres, i.e., from 0.2 to 20 atmospheres, although atmospheric pressure reactions are convenient. The degree of completeness of the reaction can be determined by the rate and quantity of hydrogen evolved, the rate at which solid products form and precipitate from solution, or by analysis of the reaction mixture. The reaction generally requires about 2 to 200 hours, depending upon the ratio of reactants, the particular reactants and solvents employed and the temperature and pressure of the reaction.

The reaction can or need not be conducted in a solvent common for the reactants but inert with respect to the reactants. Such solvents include aliphatic hydrocarbon solvents such as n-pentane, hexane, and heptane, aromatic hydrocarbon solvents such as benzene, toluene and xylene, and cycloaliphatic solvents such as cyclohexene and methylcyclohexane. The amount of solvent can vary widely but generally ranges up to about 50 times the weight of the reactants.

The process of the invention is illustrated in detail by the following examples. In the examples, the term "moles" signifies gram moles.

Example 1

A mixture of 6.15 g. (0.041 mole) of monoethyldecaborane and 40 ml. (0.49 mole) of tetrahydrofuran was sealed in a 250 ml. autoclave. Without stirring, the autoclave was pressured to 100 p.s.i. with acetylene (0.058 mole), stirring was begun, and the mixture was heated at 125° C. for 14 hours. The tetrahydrofuran was distilled from the reaction mixture under reduced pressure, leaving a thick viscous liquid. The liquid was dissolved in about 250 ml. of pentane, forming a cloudy solution. Trimethylamine was bubbled through the pentane solution for about 5 minutes to remove the unreacted ethyldecaborane, which then separated to form an insoluble liquid phase at the bottom of the flask. Decaborane and alkyldecaboranes can be separated from the acetylenic decaborane compounds by means of trimethylamine, since at room temperature these boranes form a complex with one mole of trimethylamine which is insoluble in ether, benzene, kerosene, and pentane. The acetylenic-decaborane compounds do not react with trimethylamine under these conditions. The pentane solution was refluxed for about 15 to 30 minutes to accelerate the separation of the insoluble liquid. The clear pentane solution was decanted and distilled under reduced pressure. About 3 ml. (specific gravity at 20/4 was 0.95) of the desired liquid product, shown by mass spectrographic analysis to be $C_2H_5B_{10}H_9(CHCH)$, was distilled overhead at a temperature of 73° to 75° C. and a pressure of 0.6 mm. of mercury absolute. A small amount of material distilled at 75° to 80° C. and a pressure of 0.4 mm. of mercury absolute. The molecular weight of the two samples was the same (172), but the infrared spectra were different. They are perhaps isomeric.

Example 2

To 175 ml. (2.0 moles) of dioxane in a three-necked flask equipped with a reflux condenser, gas delivery tube, and a magnetic stirrer, was added 6.0 g. (0.04 mole) of monoethyldecaborane. Acetylene was bubbled through the refluxing solution for 5 hours, at the end of which period mass spectral analysis showed none of the desired product. At this point 1.0 g. (0.01 mole) of triethylamine was added and the addition of acetylene to form a saturated solution was continued while the mixture was refluxed. Samples of the dioxane solution were removed at irregular time intervals and analyzed mass spectrometrically, primarily for product and unreacted starting material. At the end of 45 hours a mass spectrometric determination of the reaction mixture indicated the presence of 0.3 mole percent of unreacted monoethyldecaborane and 0.9 mole percent of the liquid reaction product, $$C_2H_5B_{10}H_9(CHCH)$$

a 45 percent yield based on original borane. This product can be separated from the reaction mixture by distilling off the reaction solvents, removing the unreacted monoethyldecaborane with trimethylamine from a pentane solution of the residual reaction mixture, and distilling the pentane solution under reduced pressure, as shown in Example 1.

Example 3

To 175 ml. (1.5 moles) of xylene in a three-necked flask equipped with a reflux condenser, gas delivery tube, and magnetic stirrer, was added 6.0 g. (0.04 mole) of monoethyldecaborane and 1.0 g. (0.01 mole) of triethylamine. Acetylene then was bubbled through to saturate the mixture over a period of 3.5 hours while the mixture was heated under reflux. Samples of the xylene solution were removed periodically and analyzed mass spectrometrically, primarily for product and unreacted starting material. At the end of the 3.5 hour reaction period a mass spectrometric determination of the reaction mixture indicated the presence of 3.0 mole percent of unreacted ethyldecaborane and 0.34 mole percent of the reaction product, $C_2H_5B_{10}H_9(CHCH)$, a 13 percent yield. This product can be separated from the reaction mixture by distilling off the reaction solvents, removing the unreacted monoethyldecaborane with trimethylamine from a pentane solution of the residual reaction mixture, and distilling the pentane solution under reduced pressure, as shown in Example 1.

Example 4

To 175 ml. (1.5 moles) of xylene in a three-necked flask equipped with a reflux condenser, gas delivery tube, and magnetic stirrer, was added 6.0 g. (0.04 mole) of monoethyldecaborane and 0.7 g. (0.01 mole) of isobutyronitrile. Acetylene then was bubbled through to saturate the mixture over a period of 8 hours while the mixture was heated under reflux. Samples of the xylene solution were removed periodically and analyzed mass spectrometrically, primarily for product and unreacted starting material. At the end of the 8 hour reaction period a mass spectrometric determination of the reaction mixture indicated the presence of 3.7 mole percent of unreacted monoethyldecaborane and 0.27 mole percent of the liquid reaction product, $C_2H_5B_{10}H_9(CHCH)$, a 10 percent yield. This product can be separated from the reaction mixture by distilling off the reaction solvents, removing the unreacted monoethyldecaborane with trimethylamine from a pentane solution of the residual reaction mixture, and distilling the pentane solution under reduced pressure, as shown in Example 1.

Example 5

A mixture of 5 g. (0.041 mole) of decaborane in 40 ml. (0.49 mole) of tetrahydrofuran in a 250 ml. autoclave with 100 p.s.i. of acetylene (0.058 mole) was heated overnight at 125° C. The solvent was removed by distillation at reduced pressure. The residue, a dark thick oil, was sublimed. After most of the sublimable material had been removed, the sublimation temperature was increased to 120–30° C. The residue began to react and decompose vigorously and exothermically. The sublimed material that was recovered was mostly desired product, $B_{10}H_{10}(CHCH)$, with very little decaborane.

Example 6

A mixture of 2 g. (0.016 mole) of decarborane and 30 ml. (0.37 mole) of tetrahydrofuran was sealed in a 250 ml. autoclave. Without stirring the autoclave was pressured to 50 p.s.i. with methylacetylene (0.030 mole), stirring was begun, and the mixture was heated at 125° C. for five hours. Mass spectrographic analysis showed that the tetrahydrofuran solution of the reaction product was 0.7 percent decaborane and 4.4 percent of the desired product. The tetrahydrofuran was distilled at reduced pressure and the residue was sublimed. The sublimed material (about 2.2 g.) was 88 percent desired methylacetylene-decaborane product $B_{10}H_{10}(CHCCH_3)$, and 12 percent decaborane, as shown by mass spectrometric analysis.

Example 7

A mixture of 5 g. (0.041 mole) of decaborane, 40 ml. (0.76 mole) of acetonitrile and 100 p.s.i.g. of methylacetylene (0.058 mole) in a 250 ml. Magne-Dash autoclave stood at room temperature for 48 hours. There was no increase in pressure. The mixture was heated at 55° C. for 24 hours. The increase in pressure was small and very slow. The mixture was heated at 80° C. for 18 hours. The pressure increased 100 p.s.i.g. The reaction products were removed from the autoclave and placed in a 125 ml. flask.

The excess acetonitrile was distilled off at room temperature and reduced pressure. The residue was refluxed with 200 ml. of pentane. After the mixture had cooled to room temperature, trimethylamine was bubbled through to precipitate any unreacted decaborane. After the oil precipitate had settled, the pentane solution was decanted and the pentane was distilled. The residue (2.5 g.), was crystallized from 75 ml. of pentane by cooling in Dry Ice.

Example 8

To 3 g. (0.025 mole) of decaborane in 40 ml. (0.49 mole) of tetrahydrofuran was added 5 ml. (0.049 mole) of diethylamine. The solution turned yellow and became warm. There was no precipitate. The mixture was refluxed and methylacetylene was bubbled through. A sample taken after five minutes showed the presence of the desired product by the mass spectrometric analysis. After the solution had refluxed for about two hours a yellow precipitate formed. Another mass spectrometric analysis was taken after 3 hours and one after 12 hours. All samples contained the desired product.

Example 9

A mixture of 4 g. (0.033 mole) of decaborane, 4.5 g. (0.065 mole) of isobutyronitrile, and 50 ml. (0.48 mole) of ethyl ether were sealed in a 250 ml. autoclave. Methyl acetylene was added without stirring to a pressure of 80 p.s.i.g. (0.044 mole), and the mixture was heated overnight without stirring. The ether solution after reaction was shown by mass spectrographic analysis to have a decaborane to desired product ($B_{10}H_{10}CHCCH_3$) ratio of 2. The ether was distilled and the semi-solid residue was again found to have a decaborane to desired product ratio of 2. The semi-solid was sublimed, after which mass spectrometric analysis showed a decaborane to desired product ratio of 3. The desired product free from decaborane can be obtained by treating the sublimed residue in the manner shown in Example 7.

Example 10

A mixture of 5 g. (0.041 mole) of decaborane, 2.7 g. (0.041 mole) of isopropenylacetylene and 40 ml. (0.49 mole) of tetrahydrofuran was heated overnight in an autoclave at 120° C. The tetrahydrofuran was distilled at reduced pressure, the residue was dissolved in pentane and treated with trimethylamine. The pentane solution was decanted and distilled and the residue was sublimed. The white crystalline product was crystallized from pentane to give 3 g. of white solid of the formula $B_{10}H_{10}$-$(CHCC(=CH_2)CH_3)$.

Example 11

The reactor used was a 100 ml. three-necked flask fitted with a water cooled reflux condenser, a nitrogen inlet, and a rubber septum cap. The outlet of the condenser was fitted with a drying tube filled with sodium hydroxide. The flask was filled with an atmosphere of nitrogen. 5 g. (0.041 mole) of decaborane, 3.3 g. (0.08 mole) of acetonitrile, 3.4 g. (0.041 mole) of 1-hexyne, and 50 ml. (0.56 mole) of benzene were mixed in the flask. The resulting solution was refluxed with constant stirring by a magnetic stirring bar. Samples were taken periodically by inserting a syringe through the rubber septum and analyzed by mass spectrometric analysis. After refluxing for 192 hours the resulting liquid was evaporated under vacuum to 7.76 g. of solids. The resulting solid smelled strongly of decaborane so it was dissolved in benzene and trimethylame was bubbled through the solution. A thick viscous liquid separated from the solution. The resulting mixture was filtered and the solvent was removed by evaporation. The remaining liquid then was distilled. A liquid fraction was collected at about 75° C. at a pressure of 0.01 mm. of Hg. Mass spectrometric analysis indicated the material to be fairly pure $B_{10}H_{10}CHC(CH_2)_3CH_3$.

Examples 12, 13 and 14 shown in Table I, together with Example 11, were performed in a similar manner, using different acetylenic compounds.

TABLE I

| Example Number | Amount of Decaborane Used, g. | Acetylenic Compound Used | Amount of Acetylenic Compd. Used, g. | Acetonitrile Used, g. | Benzene Used, ml. | Reflux Time, Hours | Product Characterization |
|---|---|---|---|---|---|---|---|
| 11 | 5 | 1-hexyne | 3.4 | 3.3 | 50 | 192 | (a) |
| 12 | 5 | 1-pentyne | 2.8 | 3.3 | 50 | 192 | (b) |
| 13 | 5 | 4-octyne | 4.4 | e 5 | 50 | 77 | (c) |
| 14 | 10 | 1,6-heptadiyne | 3.8 | 3.3 | 50 | 92 | (d) | a The liquid product was indicated by mass spectrometric analysis to be fairly pure $B_{10}H_{10}CHC(CH_2)_3CH_3$.
b A 1-pentyne decaborane product was sublimed from the product. This white solid gave a M.P. 60–62° C. and was $B_{10}H_{10}CHC(CH_2)_2CH_3$.
c The 4-octyne decaborane product gave a resinous material from which no crystalline solid could be separated. The product $B_{10}H_{10}C(CH_2CH_2CH_3)C(CH_2CH_2CH_3)$ was shown to be present in the resinous material by mass spectrometric analysis.
d The 1,6-heptadiyne decaborane product upon sublimation gave a white solid, M.P. 355–357° C. The product was $B_{10}H_{10}CHC(CH_2)_3CCHB_{10}H_{10}$.
e An additional 10 g. of acetonitrile was added after approximately 48 hours.

Example 15

5 g. (0.041 mole) of decaborane, 9 ml. (0.084 mole) of diethyl sulfide and 40 ml. (0.38 mole) of diethyl ether were placed in a 250 ml. Magne-Dash autoclave, which then was flushed with nitrogen. Acetylene was added without stirring to a pressure of 100 p.s.i.g. (0.058 mole). The mixture was stirred and the pressure dropped to 40 p.s.i.g. The autoclave was heated at 140° C. for 3 hours. After cooling, the reaction product, which consisted of two layers, was transferred to a 200 ml. flask and the ether was distilled off. Excess diethylsulfide then was pumped off at room temperature and reduced pressure. The yellow, oily residue was sublimed to give 3.5 g. of a white solid product, which was identified by mass spectrometric analysis as $B_{10}H_{10}(CHCH)$, a 60 percent yield based on the decaborane used.

Example 16

5 g. (0.041 mole) of decaborane, 3 ml. (0.028 mole) of diethyl sulfide and 40 ml. (0.38 mole) of diethyl ether were placed in a 250 ml. Magne-Dash autoclave, which then was flushed with nitrogen. Acetylene was added without stirring to a pressure of 100 p.s.i.g. (0.058 mole). The mixture then was stirred and the pressure dropped to 40 p.s.i.g. The mixture was heated with stirring at 110° C. for 15 hours. After cooling, the reaction product was transferred to a 200 ml. flask and the ether was distilled off. The yellow oily residue was sublimed to give 4.7 g. of white solid product (a yield of 80 percent based on the decaborane used), which mass spectrographic analysis showed to be $B_{10}H_{10}(CHCH)$.

Example 17

6.15 g. (0.041 mole) of monoethyldecaborane, 3 ml. (0.028 mole) of diethyl sulfide and 40 ml. (0.38 mole) of diethyl ether were placed in a 250 ml. Magne-Dash autoclave, which then was flushed with nitrogen. Acetylene was added without stirring to a pressure of 100 p.s.i.g. (0.058 mole). The mixture then was stirred and the pressure dropped to 40 p.s.i.g. The mixture was heated with stirring at 100° C. for 15 hours. The pressure rose from 120 p.s.i.g. (at 100° C.) to 200 p.s.i.g. (at 100° C.). The autoclave was cooled, the clear yellow solution was placed in a 100 ml. flask, and the ether was removed by distillation. The yellow, oily residue was transferred to a 20 ml. flask and distilled. The product was 6.2 g. of clear liquid, distilling at 60–75° C. at a pressure of 0.4 mm. of mercury absolute. Mass spectrometric analysis of the product showed it to be 70 percent $C_2H_5B_{10}H_9(CHCH)$ and 30 percent monoethyldecaborane.

Example 18

6.15 g. 0.041 mole) of monoethyldecaborane and 40 ml. (0.54 mole) of dimethyl sulfide were placed in a 250 ml. Magne-Dash autoclave, which then was flushed with nitrogen. Acetylene was added without stirring to a pressure of 100 p.s.i.g. (0.058 mole). The mixture then was stirred and the pressure dropped to 40 p.s.i.g. The mixture was heated with stirring at 110° C. for 15 hours. After cooling, the reaction product was transferred to a 100 ml. flask and the dimethyl sulfide was distilled off. The yellow, oily residue was transferred to a 20 ml. flask and distilled. The product was 2.1 g. of liquid, distilling at 65–75° C. at a pressure of 3 mm. of mercury absolute. The product was redistilled to give 1.9 g. of liquid, boiling at 65° C. at a pressure of 3 mm. of mercury absolute. Infrared analysis showed the product to be the same as that obtained from the reaction of Example 1 using tetrahydrofuran as solvent. The liquid product was found to contain 60.7, 60.8 percent boron as compared to the theoretical value of 62.8 percent boron for $C_2H_5B_{10}H_9(CHCH)$.

Example 19

In a typical small scale experiment, 10 grams (0.067 mole) of monoethyldecaborane, 8.1 grams (10 ml., 0.068 mole) of di-n-propyl sulfide, and 11.2 grams (15 ml., 0.087 mole) of di-n-butylether were placed in a glass reactor nine inches long and one inch in diameter. The reactor was fitted with an oil heating bath, a water cooled condenser, and a sintering glass sparger two inches long and one-half inch in diameter. Commercial grade acetylene, purified by a sulfuric acid-caustic train, was passed through the sintered glass sparger at about 10 cc. per minute for eight hours (300 percent excess). The temperature of the reaction was maintained at 110° C. During the reaction, the mixture foamed vigorously (hydrogen evolution) for 2 to 3 hours and then subsided slowly while the color changed from colorless to burnt orange.

At the end of eight hours, the reaction mixture was cooled, transferred to a 50 ml. pear-shaped flask, and distilled under vacuum, using a Claisen type distilling head with a cold-finger condenser and liquid fractionating take-off. After removing the di-n-propyl sulfide and di-n-butylether (15 to 16 grams total), the distillation pressure increased slowly from about 0.2 mm. to 1.0 mm. Hg absolute. The pressure increase was due to the thermal decomposition of sulfur-containing non-distillables (4 to 5 grams). About 8.5 grams (74 percent yield) of $C_2H_5B_{10}H_9(CHCH)$ was obtained (B.P. 70° C./0.3 mm.—92° C./1.0 mm.; $N_D^{25}$ 1.5369).

For safety purposes, the distillation was halted when the pressure reached 1.0 mm. Hg absolute (bath temperature 170° C.) since decomposition of the non-distillables became quite vigorous above these limits.

Example 20

In a typical large scale experiment, 100 grams (0.67 mole) of monoethyldecaborane, 86 grams of di-n-propyl sulfide (0.81 mole), and 115.3 grams (0.87 mole) of di-n-butylether were placed in a 1-liter three-necked flask equipped with a high speed turbine stirrer (5000 r.p.m.), water cooled condenser, sintered glass sparger tube, and an oil heating bath. Commercial grade acetylene, purified by a sulfuric acid-caustic train, was passed through the sintered glass sparger at 90 cc. per minute for eight hours (300 percent excess). The temperature of the reaction was maintained at 110° C. During the reaction, the mixture foamed vigorously (hydrogen evolution) for 2 to 3 hours and then subsided slowly while the color changed from colorless to burnt orange.

At the end of eight hours, the reaction mixture was cooled and transferred to a 1-liter distilling flask and the di-n-butylether and di-n-propyl sulfide were removed under vacuum (175 to 180 grams total). The residue was cooled, transferred to a 250 ml. flask and distilled under vacuum using a Claisen-type head with a cold-finger condenser and liquid fractionating take-off. About 80.1 grams (70.2 percent yield) of $C_2H_5B_{10}H_9(CHCH)$ was obtained (B.P. 70° C./0.3 mm.—110° C./2.5 mm.; $N_D^{25}$ 1.5371). The distillation pressure increase from 0.3 mm. to 2.5 mm. was due to thermal decomposition of the sulfur-containing non-distillables (about 50 grams). For safety purposes, the distillation was stopped at a pot temperature of 150° C., since above this temperature the decomposition becomes quite vigorous.

Example 21

Vinyl acetylene was prepared according to the procedure of Hennion, Price, and McKeon, J. Am. Chem. Soc. 76, 5160 (1954) using 400 grams potassium hydroxide, 500 ml. ethylene glycol, 100 ml. 2-n-butoxyethanol, and 125 grams 1,3-dichloro-2-butene. The vinyl acetylene was bubbled directly into a flask containing 50 grams decaborane, 60 ml. diethyl sulfide, and 300 ml. benzene and equipped with a Dry Ice condenser. The reaction mixture had been heated to reflux for about 1 hour before addition of vinyl acetylene was begun and heating was continued for 6½ hours after the addition of vinyl acetylene was begun. The benzene was removed at reduced pressure. A yellow liquid remained from which sublimed 15 grams (approximately a 21 percent yield) of $B_{10}H_{10}CHCCHCH_2$.

Examples 22 through 51

Examples 22 through 51 were performed in a manner similar to Examples 19 and 20, depending upon the reactant quantities. In these examples, monoethyldecaborane was reacted with an approximately 300 percent molar excess of acetylene. The pertinent data are presented in Table II.

|  | A | B | C |
|---|---|---|---|
| Monoethyldecaborane | 66.6 | 66.9 | 66.4 |
| Diethyldecaborane | 24.9 | 23.3 | 27.8 |
| Triethyldecaborane | 5.2 | 4.6 | 3.3 |
| Tetraethyldecaborane | 0.9 |  | Trace |
| Decaborane | 2.3 | 5.2 | 1.8 |
| Kerosene |  |  | 0.7 |
| Ref. Ind. 25° C | 1.5520 |  |  |

The pertinent data are presented in Table IV below.

TABLE II

| Ex. | Temp., °C. | Time, hours | Ether, Ester, Aromatic or Sulfide, grams | Sulfide, grams | Borane, grams | Molar Ratio Sulfide to Borane | Product, grams | Ref. Ind. 25° C. | Appt. Yld.,[a] Percent |
|---|---|---|---|---|---|---|---|---|---|
| 22 | 90 | 45 | 11.0 n-propyl ether | 8.4 ethyl | 10.0 | 1.4 | 8.0 | 1.5406 | 70.4 |
| 23 | 90 | 45 | 13.5 ethyl acetate | do | 10.0 | 1.4 | 7.2 | 1.5372 | 63.2 |
| 24 | 94 | 43 | 15.4 1,4-dioxane | do | 10.0 | 1.4 | 8.7 | 1.5415 | 76.3 |
| 25 | 82 | 24 | 13.3 benzene | do | 10.0 | 1.4 | 4.3 | 1.5426 | 37.7 |
| 26 | 82 | 48 | do | do | 10.0 | 1.4 | 5.3 | 1.5400 | 46.5 |
| 27 | 104 | 48 | 13.0 toluene | do | 10.0 | 1.4 | 6.6 | 1.5400 | 57.7 |
| 28 | 96 | 46 | 21.0 ethyl sulfide | do | 10.0 | 1.4 | 7.0 | 1.5395 | 61.3 |
| 29 | 90 | 48 | 11.5 n-butyl ether | do | 10.0 | 2.5 | 8.4 | 1.5322 | 73.5 |
| 30 | 80 | 48 | 13.3 tetrahydrofuran | do | 10.0 | 1.4 | 2.1 | 1.5432 | 18.4 |
| 31 | 110 | 24 | 11.5 n-butyl ether | 8.1 n-propyl | 10.0 | 1.0 | 9.5 | 1.5385 | 83.2 |
| 32 | 110 | 48 | do | do | 10.0 | 1.0 | 8.6 | 1.5394 | 75.2 |
| 33 | 106 | 13 | do | do | 10.0 | 1.0 | 9.3 | 1.5372 | 81.5 |
| 34 | 130 | 8 | 10.9 n-butyl ether | 8.4 n-propyl | 10.0 | 1.1 | 7.6 | 1.5380 | 66.5 |
| 35 | 110 | 8 | 12.2 n-butyl ether | 9.6 n-propyl | 10.0 | 1.2 | 9.2 | 1.5357 | 80.3 |
| 36 | 87 | 8 | 11.2 n-butyl ether | 8.1 ethyl | 10.0 | 1.4 | 5.6 | 1.5340 | 49.1 |
| 37 | 110 | 8 | 11.1 n-butyl ether | 12.0 n-butyl | 10.0 | 1.3 | 9.2 | 1.5333 | 80.4 |
| 38 | 110 | 8 | 116.4 n-butyl ether | 96.0 n-propyl | 100 | 1.2 | 83.4 | 1.5388 | 73.1 |
| 39 | 110 | 8 | 115.3 n-butyl ether | do | 100 | 1.2 | 80.1 | 1.5371 | 70.2 |
| 40 | 110 | 8 | 113.9 n-butyl ether | do | 100 | 1.2 | 80.4 | 1.5382 | 70.5 |
| 41 | 110 | 8 | 114.7 n-butyl ether | 84.4 n-bu methyl | 100 | 1.2 | 89.1 | 1.5375 | 77.8 |
| 42 | 112 | 4 | 11.1 n-butyl ether | 7.8 n-propyl | 10 | 1.0 | 7.6 | 1.5360 | 66.5 |
| 43 | 112 | 6 | do | do | 10 | 1.0 | 8.2 | 1.5385 | 71.6 |
| 44 | 112 | 2 | do | do | 10 | 1.0 | 7.1 | 1.5372 | 62.0 |
| 45 | 110 | 8 | 11.2 n-butyl ether | do | 10 | 1.0 | 8.5 | 1.5369 | 74.2 |
| 46 | 110 | 8 | 115 n-butyl ether | 118 n-butyl | 100 | 1.2 | 81.9 | 1.5317 | 71.5 |
| 47 | 110 | 4 | 11.1 n-butyl ether | 6.9 n-bu methyl[b] | 10 | 1.0 | 8.0 | 1.5358 | 69.7 |
| 48 | 110 | 6 | 11.2 n-butyl ether | do | 10 | 1.0 | 8.6 | 1.5382 | 75.2 |
| 49 | 112 | 8 | 20.6 n-propyl sulfide | XS n-propyl | 10 | XS | 4.7 | 1.5370 | 41.0 |
| 50 | 110 | 8 | 18.8 n-bu me sulfide | XS n-bu methyl[b] | 10 | XS | 9.0 | 1.5372 | 78.6 |
| 51 | 112 | 8 | None | 20.6 n-propyl | 10 | 2.65 | 2.9 | 1.5338 | 25.3 |

[a] Apparent yield based on borane. [b] Recovered from previous reactions by distillation.

Examples 52 and 53

Examples 52 and 53 were performed in a manner similar to Example 19. In Examples 52 and 53, diethyldecaborane was reacted with an approximately 300 percent molar excess of acetylene. The pertinent data are presented in Table III.

Example 73

10 g. of decaborane, 60 ml. of diethyl ether, 4 ml. of diethyl sulfide, and 6.5 g. of isopropenylacetylene were put into a 250 cc. autoclave. These ingredients were allowed to react at a temperature of 95° C. for 17 hours,

TABLE III

| Example | Temp., °C. | Time, hours | Ether, grams | Sulfide, grams | Borane, grams | Mole Ratio Sulfide to Borane | Product, grams | Ref. Ind. 25° C. | Appt. Yld.,[a] Percent |
|---|---|---|---|---|---|---|---|---|---|
| 52 | 110 | 24 | 11.1 n-butyl | 6.6 n-propyl | 10 | 1.0 | 9.0 | 1.5288 | 78.5 |
| 53 | 110 | 8 | 11.0 n-butyl | do | 10 | 1.0 | 8.9 | 1.5307 | 77.8 |

[a] Apparent yield based on borane.

Examples 54 through 72

Examples 54 through 72 were performed in a manner similar to Examples 19 and 20, depending upon the reactant quantities. In these examples, a mixture of alkyldecaboranes were reacted with an approximately 300 percent molar excess of acetylene. Three alkyldecaborane mixtures were employed having the following compositions.

during which time a maximum pressure of 255 p.s.i.g. was reached. The diethyl ether was removed by distillation at atmospheric pressure and the product was distilled at 1 mm. mercury pressure absolute at approximately 100° C. 11.2 g. of product, a 68 percent yield was obtained. The white crystalline material softened at 35° C. and melted at 40° C. Mass spectrometric analysis

TABLE IV

| Ex. | Temp., °C. | Time, hours | Ether, grams | Sulfide, grams | Borane Mixture, grams | Molar Ratio Sulfide to Borane | Product, grams | Ref. Ind. 25° C. | Appt. Yld.,[a] Percent |
|---|---|---|---|---|---|---|---|---|---|
| 54 | 95 | 48 | 33.3 n-butyl | 24.4 ethyl | 30.0 A | 1.5 | 23.9 | 1.5302 | 69.9 |
| 55 | 93 | 64 | 68.0 n-butyl | 50.0 ethyl | 60.0 A | 1.5 | 44.3 | 1.5348 | 64.9 |
| 56 | 80 | 9 | 137 n-butyl | 50.5 ethyl | 60.0 A | 1.5 | 42.5 | 1.5380 | 62.2 |
| 57 | 107 | 8 | 11.0 n-butyl | 8.3 n-propyl | 10.2 A | 1.2 | 8.9 | 1.5362 | 77.5 |
| 58 | 106 | 9 | 12.7 n-butyl | 7.0 n-propyl | 10.0 A | 1.0 | 7.8 | 1.5368 | 68.4 |
| 59 | 110 | 8 | 11.1 n-butyl | 5.3 n-propyl | 10.0 A | 0.75 | 8.3 | 1.5376 | 72.8 |
| 60 | 110 | 8 | 11.2 n-butyl | 8.0 n-propyl | 10.0 A | 1.1 | 8.5 | 1.5357 | 74.2 |
| 61 | 110 | 8 | 11.3 n-butyl | 3.5 n-propyl | 10.0 A | 0.5 | 8.5 | 1.5375 | 74.2 |
| 62 | 110 | 8 | 11.4 n-butyl | 93.0 n-propyl | 100 B | 1.2 | 82.6 | 1.5378 | 72.5 |
| 63 | 112 | 8 | 11.1 n-butyl | 1.8 n-propyl | 10.0 B | 0.25 | 8.6 | 1.5382 | 75.2 |
| 64 | 110 | 8 | do | 6.2 n-bu methyl | 10.0 B | 1.0 | 9.3 | 1.5339 | 81.3 |
| 65 | 110 | 8 | do | 7.0 n-bu ethyl | 10.0 B | 1.0 | 8.4 | 1.5353 | 73.6 |
| 66 | 110 | 8 | 11.3 n-butyl | 6.2 n-bu methyl | 10.0 B | 1.0 | 8.7 | 1.5350 | 76.4 |
| 67 | 110 | 8 | 113.3 n-butyl | 96.0 n-propyl[b] | 100 C | 1.2 | 77.8 | 1.5376 | 68.0 |
| 68 | 110 | 8 | 113.1 n-butyl | do[b] | 100 C | 1.2 | 79.4 | 1.5376 | 69.3 |
| 69 | 110 | 8 | 115.8 n-butyl | do[b] | 100 C | 1.2 | 84.0 | 1.5376 | 73.2 |
| 70 | 110 | 8 | 115.7 n-butyl | 98.5 n-propyl[b] | 100 C | 1.2 | 79.9 | 1.5374 | 69.7 |
| 71 | 110 | 8 | 114.0 n-butyl | 96.0 n-propyl[b] | 100 C | 1.2 | 79.0 | 1.5376 | 69.0 |
| 72 | 110 | 8 | do | do[b] | 100 C | 1.2 | 79.0 | 1.5370 | 69.0 |

[a] Apparent yield based on borane. [b] Commercial grade.

showed the product to contain 1.5 mole percent of decaborane and 98.5 mole percent of

Example 74

10 g. of decaborane, 4 ml. of diethyl sulfide, 60 ml. of diethyl ether, and 6.5 g. (9 ml.) of isopropenylacetylene were allowed to react in an autoclave at a temperature of 95° C. for 16 hours. Maximum pressures of 325 p.s.i.g. at 95° C. and 225 p.s.i.g. while at room temperature were obtained. Trimethylamine was bubbled through the reaction mixture to complex the decaborane. This was filtered through a filter aid (Celite) and the ether was removed under reduced pressure. An oily solid weighing 11.0 g. remained, which was found by mass spectrometric analysis to be primarily with 0.8 mole percent of decaborane and ether. This material was washed twice with concentrated $H_2SO_4$ and water successively, and was then found by mass spectrometric analysis to contain 97.3 weight percent of and 2.7 weight percent of water. The material was then put in a vacuum desiccator over $H_2SO_4$ overnight, and was found to weigh 5.3 g., a 35.1 percent yield.

Example 75

10 g. of decaborane, 4 ml. of diethyl sulfide, 60 ml. of diethyl ether, and 6.5 g. of isopropenylacetylene were allowed to react in an autoclave at 95° C. for 3 hours. A maximum pressure of 250 p.s.i.g. was obtained. The reaction mixture was found by mass spectrometric analysis to contain 7.6 mole percent of 4.4 mole percent of decaborane, and isopropenylacetylene. No decaborane-ethyl sulfide complex was present. Trimethylamine was bubbled through the mixture to remove the decaborane, and the complex thus formed was filtered out into a weighed funnel. Mass spectrometric analysis of the 3.5 g. of material collected indicated it was mostly decaborane and free trimethylamine, with 10.3 mole percent of present. Infrared analysis indicated the monotrimethylamine-decaborane complex plus some and possibly some material containing B—O bonds.

Example 76

10 g. of decaborane, 4 ml. of diethyl sulfide, 60 ml. of diethyl ether, and 6.5 g. of isopropenylacetylene were allowed to react at a temperature of 95° C. for 16 hours, obtaining a maximum pressure of 325 p.s.i.g. The reaction mixture was divided into two equal portions. Trimethylamine was bubbled through portion A, resulting in the formation of a sticky solid material which adhered to glass. The mixture was filtered through a filter aid (Celite), the ether was evaporated off and the remaining material was washed with concentrated $H_2SO_4$ and water. 4.7 g., a 62 percent yield, of product was obtained which was found by mass spectrometric analysis to contain 92.0 weight percent of 1.0 weight percent of $B_{10}H_{14}$, 6.2 weight percent of $H_2O$, and 0.7 weight percent of $SO_2$. Portion B was put directly into concentrated $H_2SO_4$ with stirring for two hours, and then filtered. The material was very sticky and difficulty was encountered during filtration due to clogging of the fritted glass filters. The material was washed with water and filtered. A 78 percent yield of product, 5.9 g., was obtained which mass spectrometric analysis indicated contained 93.3 weight percent of 1.2 weight percent of $B_{10}H_{14}$, 0.1 weight percent of $SO_2$, and 5.4 weight percent of $H_2O$.

Example 77

10 g. of decaborane, 20 ml. of isopropenylacetylene, 17.7 ml. of diethyl sulfide, and 50 ml. of benzene were allowed to react in a glass reactor. The reaction was conducted for 7½ hours and a total of 2.8 liters of gas were evolved. The benzene was removed from the reaction mixture by evaporation and the product was washed with concentrated $H_2SO_4$ and water. The was dissolved in diethyl ether. Trimethylamine was bubbled through and the mixture was filtered. Magnesium sulfate was added to the ether solution, the solution was filtered, and the ether was evaporated to give 5.7 g. of dry product, a 39 percent yield.

Example 78

8 g. of decaborane, 14 ml. of diethyl sulfide, 25 ml. of isopropenylacetylene, and 50 ml. of di-n-butyl ether were allowed to react at atmospheric pressure at a temperature of 80° C. for 5½ hours. 2.7 liters of gas were evolved during the reaction period. After the reaction 40 ml. of methyl alcohol were added to the reaction mixture to hydrolyze unreacted decaborane and the mixture was refluxed for 2½ hours. The solvents were distilled off at 100° C. and ½ atmosphere pressure. A fraction was removed at 100° to 130° C. at 5 mm. Hg absolute pressure and this fraction, weighing 2.5 g., was found by mass spectometric analysis to contain 19.5 percent 2.5 percent decaborane, 77.3 percent butyl ether and 0.6 percent ethyl sulfide. The residue was distilled at 5 mm. Hg absolute and 160° C. The product, which weighed 8.6 g., was found by mass spectrometric analysis to contain 94.6 percent 3.3 percent decaborane, 1.0 percent butyl ether and 1.0 percent ethyl sulfide. The yield of as calculated from the product weight and composition was 71.5 percent. Duplicate chemical analyses of the product obtained from the distillation at 5 mm. and 160 ° C. showed the product to contain 54.1, 54.5 percent boron.

Example 79

[Conditions: Temperature—reflux (100° C.), Time—23 hours]

| Materials | Flask 1 | Flask 2 | Flask 3 |
|---|---|---|---|
| Decaborane, g | 10 | 10 | 10 |
| Dioxane, ml | 40 | 40 | 40 |
| Diethyl sulfide, ml | 4 | 4 | |
| Di-n-butyl sulfide, ml | | | 4 |

The above ingredients were put into 3 separate 100 ml., three neck flasks, each equipped with a condenser and arranged so that acetylene would bubble through each in series. The acetylene first passed through a sulfuric acid scrubbing tower to remove acetone, then a sodium hydroxide column and a calcium chloride colum. The flasks were heated so that the reaction material refluxed. The final color of the reaction mixture was red. After 23 hours, the flasks were cooled. Some of the material from flask 3 accidentally transferred into flask 2. Samples from each flask were submitted for mass spectometric analysis, which showed flask 1, flask 2 and flask 3 to contain 5.3 mole percent, 7.1 mole percent, and 6.8 mole percent of $$B_{10}H_{10}CHCH$$

respectively, corresponding to yields of 34.6 percent, 46.4 percent and 44.4 percent, respectively. The reaction mixture from all three flasks was mixed together and the dioxane was distilled off at reduced pressure. A thick viscous liquid remained. This was put into a sublimator at reduced pressure and $B_{10}H_{10}CHCH$ was sublimed off. The product was purified from n-pentane.

acid solution. The ether solution was then stirred overnight with a mixture of 50 ml. of concentrated hydrochloric acid and 50 ml. of methanol. After washing with water and drying over magnesium sulfate, the ether was distilled and the resdue was extracted with n-pentane, about 300 ml. The pentane solution was dried over calcium chloride and distilled. The residue was sublimed at 100° C. under reduced pressure to give 14.4 g., a 37 percent yield, of $B_{10}H_{10}CHCCH_3$.

Examples 81 through 112

Examples 81 through 112 were performed in a manner similar to Example 73 at superatmospheric pressure. In each case decaborane was reacted with isopropenylacetylene to give In Examples 86 and 103 the amount of decaborane employed was 15 grams while in all other examples the amount of decaborane employed was 10 grams. The pertinent data are presented in Table V.

Examples 113 through 123

Examples 113 through 123 were performed in a manner similar to Example 78 at atmospheric pressure. In each case decaborane was reacted with isopropenylacetylene to give In Example 113 the amount of decaborane employed was 10 grams while in all other examples the amount of decaborane employed was 8 grams. In Example 113 the amount of isopropenylacetylene employed was 20 ml. while in all other examples the amount of isopropenyl-

TABLE V

| Ex. | Isopropenyl-Acetylene | Diethyl Sulfide, ml. | Diethyl Ether, ml. | Temp., °C. | Time, hours | Maximum Pressure, p.s.i.g. | Product, g. | Yield, Percent | Product Composition-Mass Spectrometric Analysis Weight Percent | | | | |
|---|---|---|---|---|---|---|---|---|---|---|---|---|---|
| | | | | | | | | | $B_{10}H_{10}CHCC(CH_3)=CH_2$ | $B_{10}H_{14}$ | $(C_2H_5)_2S$ | $SO_2$ | $H_2O$ |
| 81 | 6.5 g | 4 | 60 | 95 | 17 | 255 | 11.5 | 68 | a 98.5 | a 1.5 | | | |
| 82 | 6.5 g | 4 | 60 | 105 | 18 | 290 | 9.4 | 57 | a 88.9 | a 11.1 | | | |
| 83 | 6.5 g | 4 | 60 | 115 | 5½ | 320 | 10.0 | 61 | a 88.5 | a 11.5 | | | |
| 84 | 6.5 g | 4 | 60 | 85 | 22 | 275 | 9.4 | 57 | | | | | |
| 85 | 6.5 g | 2 | 60 | 95 | 20 | 250 | 4.5 | 27 | | | | | |
| 86 | 10g. c | 6 | b 40 | 60-65 | 28 | | | 12 | | | | | |
| 87 | 4.35 g | 4 | 60 | 95 | 17 | 305 | 8.2 | 54.4 | | | | | |
| 88 | 6.5 g | 4 | 60 | 95 | 16 | 325 | 5.3 | 35.1 | (d) | a 0.8 | | | |
| 89 | 6.5 g | 4 | 60 | 95 | 3 | 250 | 7.25 | 31 | | | | | |
| 90 | 6.5g | 4 | 60 | 95 | 16 | 325 | e 4.7 / e 5.9 | 62 / 78 | 92.0 / 93.3 | 1.0 / 1.2 | | 0.7 / 0.1 | 6.2 / 5.4 |
| 91 | 6.5 g | 4 | 60 | 95 | 7½ | 325 | 9.2 | 61 | 93.4 | 1.0 | f 4.1 | | |
| 92 | 6.5 g | 4 | 60 | 115 | 8 | g 225 | 9.7 | 64.2 | 97.4 | 1.0 | 0.3 | 1.2 | 0.8 |
| 93 | 6.5 g | 4 | 60 | 115 | 3 | g 225 | 7.4 | 49.0 | | | | | |
| 94 | 6.5 ml | h 5 | 60 | 95 | 17 | 340 | 9.9 | 65.6 | 97.0 | 1.0 | 0.6 | 0.6 | 0.8 |
| 95 | 6.5 g | h 5 | 60 | 95 | 8 | g 220 | 8.0 | 53 | | | | | |
| 96 | 6.5 g | 6.6 | 60 | 95 | | 325 | 7.6 | 50.4 | 98.1 | .9 | | | 1.0 |
| 97 | 6.5 g | 4 | 60 | 115 | 8 | g 225 | 7.8 | 51.7 | | | | | |
| 98 | 6.5 g | 4 | 60 | 95 | 4½ | 275 | 8.7 | 57.6 | | | | | |
| 99 | 6.5 g | 4 | 30 | 95 | 8 | g 175 | i 5.3 | 35.1 | 97.3 | .4 | .5 | .1 | 1.7 |
| 100 | 6.5 g | 4 | 60 | 95 | 4 | g 165 | 5.5 | 36.4 | 98.0 | .6 | .5 | .1 | .9 |
| 101 | 9 ml | 17.7 | 60 | 95 | 8 | g 240 | 10.6 | 70.2 | 96.1 | .4 | .4 | .2 | 2.8 |
| 102 | 9 ml | 4 | 30 | 95 | 8 | g 190 | 6.3 | 41.7 | 97.7 | 1.2 | .7 | .1 | .3 |
| 103 | 9.75 g | 6 | 90 | 95 | 8 | 525 | 13.8 | 61 | 92.8 | 0.6 | 0.4 | 1.4 | 4.7 |
| 104 | 6.5 g | 17.7 | 60 | 95 | 8 | g 240 | 10.3 | 68.4 | 90.9 | 0.5 | 0.4 | 0.3 | 7.9 |
| 105 | 6.5 g | 17.7 | 60 | 95 | 8 | g 240 | 7.95 | 52.6 | | | | | |
| 106 | 6.5 g | 17.7 | 60 | 95 | 8 | 275 | 8.6 | 57.0 | | | | | |
| 107 | 9 ml | 4 | 30 | 95 | 8 | g 190 | 9.9 | 65.6 | | | | | |
| 108 | 9 ml | 17.7 | 60 | 95 | 8 | g 240 | 7.0 | 46.4 | | | | | |
| 109 | 9 ml | 8.8 | 60 | 95 | 8 | 325 | 9.3 | 61.6 | 95.1 | 0.7 | 0.6 | 0.1 | 3.6 |
| 110 | 9 ml | 8.8 | 60 | 95 | 8 | 325 | 9.6 | 63.6 | 94.8 | 0.6 | 0.6 | 0.4 | 3.5 |
| 111 | 9 ml | 6.6 | 60 | 95 | 8 | g 225 | 10.0 | 66.3 | 94.3 | 0.7 | 0.5 | 0.3 | 4.3 |
| 112 | 9 ml | 6.6 | 60 | 95 | 8 | g 225 | 10.1 | 67.0 | 91.5 | 0.5 | 0.3 | 0.2 | 7.4 | a Mole percent.
b Dioxane.
c 5 g. added initially and 5 g. 6 hours later.
d Primarily 
e The reaction mixture was divided into 2 equal portions.
f Also, diethyl ether, 1.4.
g Maximum at room temperature.
h Propyl sulfide.
i Wet sample was dissolved in benzene and the benzene azeotrope was distilled off.

Example 80

A mixture of 30 g. of decaborane, 20 ml. of n-heptane, 20 ml. of dioxane and 25 ml. of diethyl sulfide was heated at 90° to 100° C. for 24 hours while methyl acetylene was bubbled through. After this time, the mixture stood at room temperature for two days and then was poured into 200 ml. of diethyl ether. Trimethylamine was bubbled into the solution for about one minute. The ether solution was decanted and the thick liquid residue was washed well with diethyl ether and the combined ether solutions were washed once with water and once with dilute hydrochloric acetylene employed was 25 ml. The pertinent data are presented in Table VI.

after intimately mixing them. The purpose in doing this, as the art is well aware, is to provide proper burning

TABLE VI

| Example | Sulfide, ml. | Benzene or Ether, ml. | Temp., °C. | Time, hours | Gas Evolution, l. | Prod., g. | Yield, Percent | Product Composition—Mass Spectrometric Analysis Weight Percent | | | | | |
|---|---|---|---|---|---|---|---|---|---|---|---|---|---|
| | | | | | | | | $B_{10}H_{10}CHCC=CH_2$ / $CH_3$ | $B_{10}H_{14}$ | $SO_2$ | $H_2O$ | Sulfide | Ether |
| 113 | a 17.7 | e 50 | (f) | 7½ | 2.8 | 5.7 | 39 | | | | | | |
| 114 | b 18.5 | d 40 | (f) | 9 | 2.7 | 6.7 | 55.5 | 97.3 | .8 | .1 | 1.3 | .6 | |
| 115 | b 18.5 | d 40 | (f) | 5½ | 2.85 | g 7.7 | 63.8 | 93.1 | 2.7 | 1.1 | 1.8 | | 1.3 |
| 116 | b 18.5 | d 40 | (f) | 6½ | 2.6 | 5.4 | 44.7 | 98.2 | .5 | .2 | .5 | .6 | |
| 117 | a 14 | d 40 | (f) | 5½ | 2.6 | 7.4 | 61.3 | 95.2 | 4.0 | | | .7 | (h) |
| 118 | a 14 | d 40 | 60–100 | 5 | 3.1 | i 5.25 k 5.7 | j 82.5 | 86 95.5 | .6 2.1 | | | .9 1.5 | 13.0 .9 |
| 119 | a 14 | d 50 | 80 | 5½ | 2.7 | i 2.5 k 8.6 | j 71.5 | 19.5 94.6 | 2.5 3.3 | | | 0.6 1.0 | 77.3 1.0 |
| 120 | a 14 | d 50 | 75 | 7 | 2.6 | i 1.6 k 8.3 | j 70.9 | 33.4 96.7 | 1.9 1.1 | | | 0.8 1.0 | 63.9 1.2 |
| 121 | a 14 | e 50 | 58 | 8 | 2.5 | 7.4 | j 60.2 | 98.2 | 1.0 | | | 0.8 | 0.0 |
| 122 | a 14 | e 40 | 68 | 7½ | 2.05 | 8.0 | j 55.2 | 82.6 | 15.5 | | | 1.1 | 0.8 |
| 123 | a 14 | e 40 | 63 | 8½ | 2.4 | 8.3 | • 66.3 | 96.5 | 2.0 | | | 1.0 | o 0.5 | a Ethyl sulfide.
b n-Propyl sulfide.
c Isopropyl ether.
d n-Butyl ether.
e Benzene.
f Temperature measuring means not available.
g Boron analysis 52.4, 53.4, 51.7 percent.
h Hydrocarbon present.
i First product fraction.
j Corrected for amount analyzed present in fractions.
k Second product fraction.

Examples 124 through 144

Examples 124 through 144 were performed in a manner similar to Example 79 at atmospheric pressure. In each case decaborane was reacted with an excess of acetylene to give $B_{10}H_{10}CHCH$. In Example 126, 4 ml. of di-n-butyl sulfide was also employed. The pertinent data are presented in Table VII.

TABLE VII

| Example | Decaborane, g. | Diethyl Sulfide, ml. | Dioxane, ml. | Temp., °C. | Time, hours | $B_{10}H_{10}CHCH$ In Final Reaction Mixture, Mole Percent | Yield Calculated from Analysis c | Product, g. | Actual Yield, Percent |
|---|---|---|---|---|---|---|---|---|---|
| 124 | k 10 | 4 | 40 | 100 | 23 | 5.3 | 34.6 | | |
| | l 10 | 4 | 40 | 100 | 23 | 7.1 | 46.4 | | |
| | m 10 | 00 | 40 | 100 | 23 | 6.8 | 44.4 | | |
| 125 | k 15 | 4 | 60 | 95–100 | a 25 | 12.3 | 68.2 | | d 66.7 |
| | l 15 | 4 | 60 | 95–100 | b 25 | 12.1 | 67.0 | | d 68.5 |
| 126 | k 10 | 13.2 | 40 | 80–100 | 42 | e 8.1 | e 67.5 | | d 78.5 |
| | l 10 | 6 | 30 | 80–100 | 42 | e 15.4 | e 87.7 | | |
| 127 | k 15 | 9 | 45 | 70–100 | 31 | 16 | | | |
| | l 15 | 6 | 30 | 70–100 | 31 | 24.2 | | | 58.4 |
| 128 | k 15 | 8.3 | 40 | 65–100 | 24 | | | i 38 | 72 |
| | l 15 | 8.3 | 40 | 65–100 | 24 | | | | |
| | m 15 | 8.3 | 40 | 65–100 | 24 | | | | |
| 129 | k 40 | 22 | 80 | 70–100 | 17 | 14.6 | | 33.8 | 71.4 |
| 130 | k 40 | 22 | f 110 | 70–100 | 17 | 10.34 | | 27 | 57 |
| 131 | k 40 | 22 | 80 | 70–105 | 24 | 17.6 | | | |
| | l 20 | 11 | 40 | 70–105 | 24 | 16.3 | | | |
| | m 20 | 11 | 40 | 70–105 | 24 | 16.5 | | 100.0 | 85 |
| | n 20 | 11 | 40 | 70–105 | 24 | 15.4 | | | |
| 132 | i 110 | j 55 | j 200 | 70–100 | 24 | | | 79.0 | 60.8 |
| 133 | j 100 | j 55 | g j 200 | 70–100 | 48½ | | | 68.6 | 58.1 |
| 134 | 80 | 55 | (h) | 70 | 24 | | | 55.4 | 58.6 | a After 17 hours, 2 ml. of sulfide was added.
b After 17 hours, 2 ml. of sulfide and 0.4 g. of carbon black was added.
c Calculated from mass spectrometric analysis.
d Actual yield after sublimation.
e After 24 hours.
f n-Propyl ether instead of dioxane.
g Toluene instead of dioxane.
h 80 ml. of dioxane and 120 ml. of n-heptane instead of just dioxane.
i Substantially pure after resublimation.
j In four flasks in series.
k Flask 1.
l Flask 2.
m Flask 3.
n Flask 4.

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the $$C_2H_5B_{10}H_9(CHCH)$$

for example, this local fuel to air ratio by weight is approximately 0.081. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliable initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these extreme conditions of altitude operations with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need to be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbons fuels. When employed in a ramjet the liquid fuels of this invention will be simply substituted for hydrocarbon fuels and used in the established manner.

Figure 1:
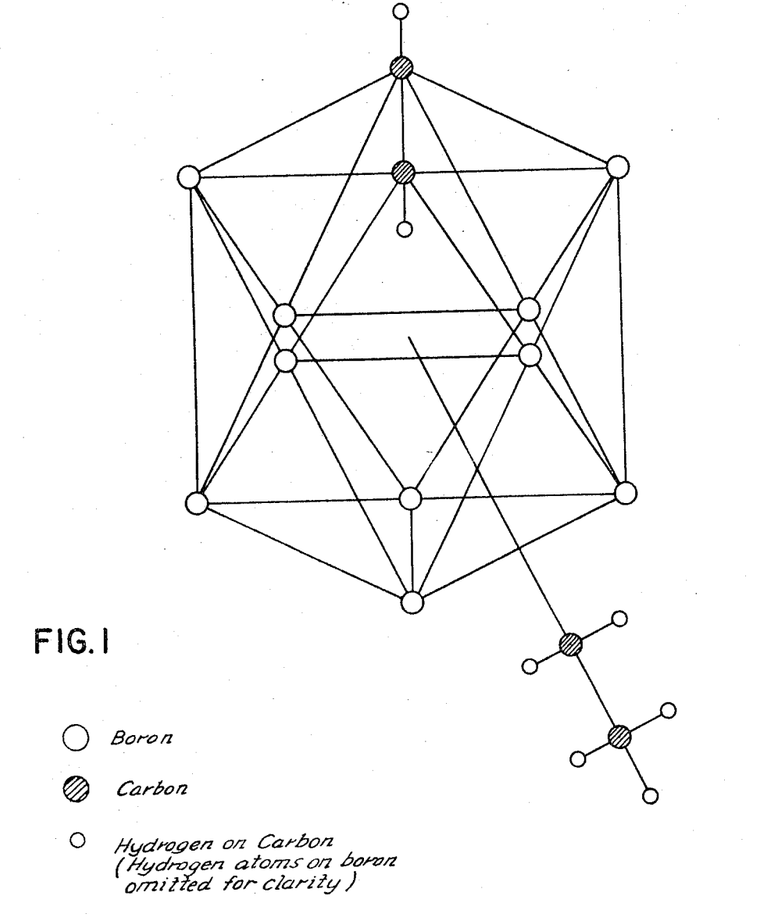

The compound of the formula $C_2H_5B_{10}H_9(CHCH)$ prepared as described in Examples 1–4, 19, 20 and 32–51 has the structural formula shown in FIGURE 1 of the accompanying drawings.

The compound of the formula $(C_2H_5)_2B_{10}H_8(CHCH)$ prepared as described in Examples 52 and 53 has the same structural formula as shown in FIGURE 1 except that another ethyl group is attached to a boron atom replacing a hydrogen atom.

Figure 2:
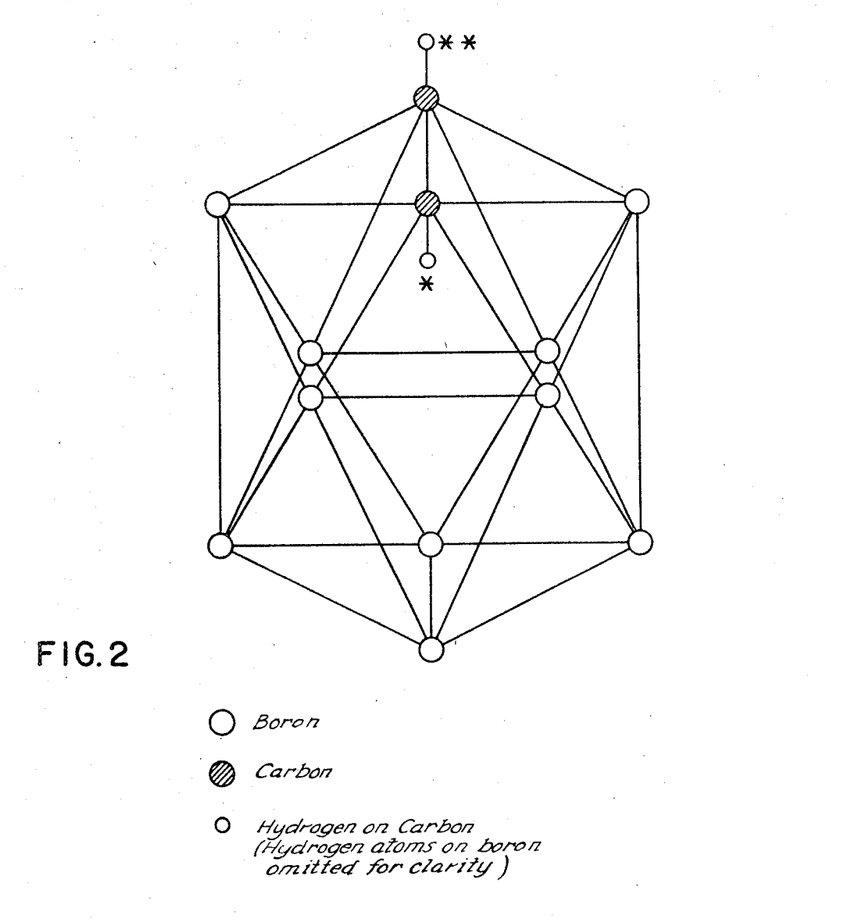

The compound of the formula $B_{10}H_{10}(CHCH)$ prepared as described in Examples 5, 79 and 124–144 has the structural formula as shown in FIGURE 2 of the accompnaying drawings.

The compound of the formula $B_{10}H_{10}(CHCCH_3)$ prepared as described in Examples 6–9 and 80 has the same structural formula as shown in FIGURE 2 with the exception that in FIGURE 2 the hydrogen atom designated with a single asterisk is replaced by a methyl radical.

The compound of the formula $$B_{10}H_{10}(CHCC(=CH_2)CH_3)$$

prepared as described in Examples 10, 73–78 and 81–123 has the same structural formula as shown in FIGURE 2 with the exception that in FIGURE 2 the hydrogen atom designated with a single asterisk is replaced by $$-C(=CH_2)CH_3.$$

The compound of the formula $$B_{10}H_{10}(CHC(CH_2)_3CH_3)$$

prepared as described in Example 11 has the same structural formula as shown in FIGURE 2 with the exception that in FIGURE 2 the hydrogen atom designated with a single asterisk is replaced by $-(CH_2)_3CH_3$.

The compound of the formula $B_{10}H_{10}CHC(CH_2)_2CH_3$ prepared as described in Example 12 has the same structural formula as shown in FIGURE 2 with the exception that in FIGURE 2 the hydrogen atom designated with a single asterisk is replaced by $-(CH_2)_2CH_3$.

The compound of the formula $$B_{10}H_{10}C(CH_2CH_2CH_3)C(CH_2CH_2C_3)$$

prepared as described in Example 13 has the same structural formula as shown in FIGURE 2 with the exception that in FIGURE 2 the hydrogen atom designated with a single asterisk and the hydrogen atom designated with a double asterisk are both replaced by $-CH_2CH_2CH_3$.

The compound of the formula $$B_{10}H_{10}CHC\overset{H}{\underset{|}{C}}=CH_2$$

prepared as described in Example 21 has the same structural formula as shown in FIGURE 2 with the exception that in FIGURE 2 the hydrogen atom designated with a single asterisk is replaced by $$-\overset{H}{\underset{|}{C}}=CH_2$$

Figure 3:
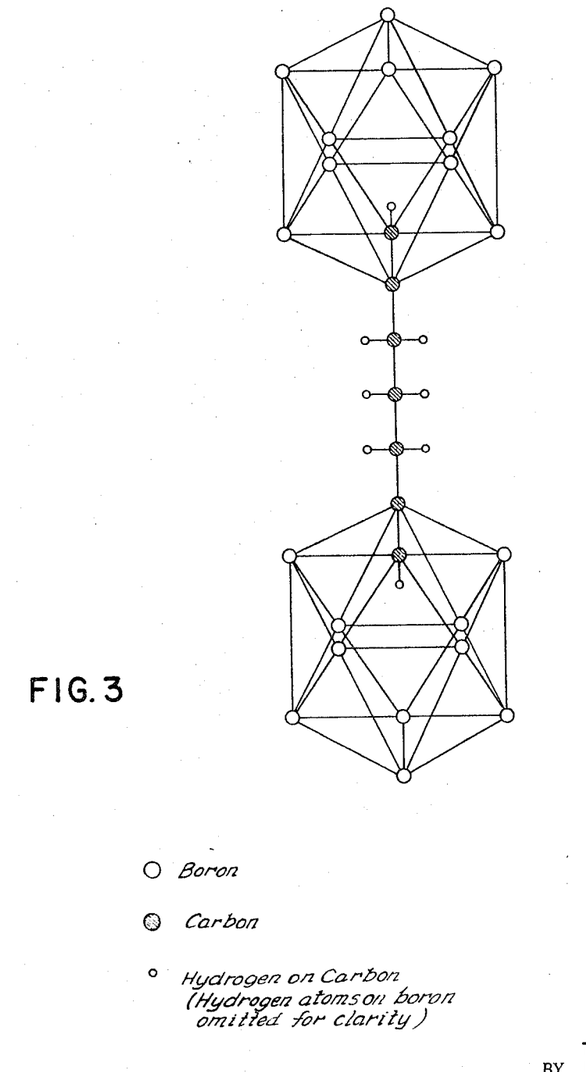

The compound of the formula $$B_{10}H_{10}CHC(CH_2)_3CCH\ B_{10}H_{10}$$

prepared as described in Example 14 has the structural formula shown in FIGURE 3 of the accompanying drawings.

It is claimed:
1. A method for the production of an organoboron compound useful as a fuel which comprises reacting with the formation of hydrogen a borane selected from the group consisting of decaborane and alkyl decaboranes having from one to two alkyl groups containing from one to five carbon atoms in each alkyl radical and an acetylenic hydrocarbon containing from two to ten carbon atoms at a temperature within the range from +25° C. to +180° C. and at a pressure of from 0.2 to 20 atmospheres while the reactants are in admixture with a material selected from the group consisting of lower dialkyl ethers, dioxane, tetrahydrofuran, ethylene glycol dialkyl ethers, hydrogen cyanide, nitriles of the saturated and unsaturated aliphatic mono- and dicarboxylic acids containing 2 to 5 carbon atoms, B,B'-oxydipropionitrile, the lower alkyl, dialkyl and trialkyl amines, alkyl diamines containing 2 to 8 carbon atoms, lower dialkyl sulfides and diphenyl sulfide, the molar ratio of said borane to said acetylenic hydrocarbon being within the range from 0.05:1 to 20:1 and the molar ratio of said material to said borane being within the range from 0.001:1 to 100:1.

2. The method of claim 1 wherein said borane is decaborane.
3. The method of claim 1 wherein said borane is monomethyldecaborane.
4. The method of claim 1 wherein said borane is monoethyldecaborane.
5. The method of claim 1 wherein said borane is diethyldecaborane.
6. The method of claim 1 wherein said acetylenic hydrocarbon is acetylene.
7. The method of claim 1 wherein said acetylenic hydrocarbon is methyl acetylene.
8. The method of claim 1 wherein said acetylenic hydrocarbon is vinyl acetylene.
9. The method of claim 1 wherein said acetylenic hydrocarbon is isopropenyl acetylene.
10. The method of claim 1 wherein said acetylenic hydrocarbon is 1-pentyne.
11. The method of claim 1 wherein said material is tetrahydrofuran.
12. The method of claim 1 wherein said material is dioxane.
13. The method of claim 1 wherein said material is dimethyl sulfide.
14. The method of claim 1 wherein said material is triethylamine.
15. The method of claim 1 wherein said material is isobutyronitrile.
16. The method of claim 1 wherein said material is acetonitrile.
17. The method of claim 1 wherein said material is diethyl ether.
18. The method of claim 1 wherein said material is diethyl sulfide.
19. The method of claim 1 wherein said material is di-n-propyl sulfide.
20. The method of claim 1 wherein said borane is monoethyldecaborane, wherein said acetylenic hydrocarbon is acetylene and wherein said material is tetrahydrofuran.
21. The method of claim 1 wherein said borane is monoethyldecaborane, wherein said acetylenic hydrocarbon is acetylene and wherein said material is dimethyl sulfide.
22. The method of claim 1 wherein said borane is monoethyldecaborane, wherein said acetylenic hydrocarbon is acetylene and wherein said material is triethylamine.
23. The method of claim 1 wherein said borane is monoethyldecaborane, wherein said acetylenic hydrocarbon is acetylene and wherein said material is isobutyronitrile.
24. The method of claim 1 wherein said borane is decaborane, wherein said acetylenic hydrocarbon is acetylene and wherein said material is tetrahydrofuran.
25. The method of claim 1 wherein said borane is decaborane, wherein said acetylenic hydrocarbon is methyl acetylene and wherein said material is tetrahydrofuran.
26. The method of claim 1 wherein said borane is decaborane, wherein said acetylenic hydrocarbon is methyl acetylene and wherein said material is acetonitrile.
27. The method of claim 1 wherein said borane is decaborane, wherein said acetylenic hydrocarbon is vinyl acetylene and wherein said material is diethyl sulfide.
28. The method of claim 1 wherein said borane is monoethyldecaborane, wherein said acetylenic hydrocarbon is acetylene and wherein said material is di-n-propyl sulfide.

29. The method of claim 1 wherein said borane is diethyldecaborane, wherein said acetylenic hydrocarbon is acetylene and wherein said material is a mixture of di-n-butyl ether and di-n-propyl sulfide.

30. Compounds selected from the class consisting of $RR'B_{10}H_8(CR''CR''')$ and $(RR'B_{10}H_8)_2(CHCR_1CCH)$ wherein R and R' are each selected from the class consisting of hydrogen and alkyl radicals containing from 1 to 5 carbon atoms, wherein R'' and R''' are each selected from the class consisting of hydrogen, an alkyl radical and a monoalkenyl hydrocarbon radical, the total number of carbon atoms in R'' and R''' taken together not exceeding eight and wherein $R_1$ is a bivalent hydrocarbon radical containing from 1 to 6 carbon atoms.

31. $C_2H_5B_{10}H_9(CHCH)$.
32. $B_{10}H_{10}(CHCH)$.
33. $B_{10}H_{10}(CHCCH_3)$.
34. 
$B_{10}H_{10}(CHC\overset{CH_3}{|}=CH_2)$ 35. $B_{10}H_{10}(CHC(CH_2)_3CH_3)$.
36. $B_{10}H_{10}CHC(CH_2)_2CH_3$.
37. $B_{10}H_{10}C(CH_2CH_2CH_3)C(CH_2CH_2CH_3)$.
38. $B_{10}H_{10}CHC(CH_2)_3CCHB_{10}H_{10}$.
39. 
$B_{10}H_{10}(CHC\overset{H}{|}=CH_2)$

40. $(C_2H_5)_2B_{10}H_8(CHCH)$.

41. A method for the production of an organoboron compound useful as a fuel which comprises reacting with the formation of hydrogen a borane selected from the group consisting of decaborane and alkyl decaboranes having from one to two alkyl groups containing from one to five carbon atoms in each alkyl radical and an acetylenic hydrocarbon containing from two to ten carbon atoms while the reactants are in admixture with a material selected from the group consisting of hydrogen cyanide, nitriles of saturated and unsaturated aliphatic mono- and dicarboxylic acids containing 2 to 5 carbon atoms, $\beta,\beta'$-oxydipropionitrile, lower monoalkyl amines, lower dialkyl amines, alkylene diamines containing 2 to 8 carbon atoms, lower dialkyl sufides and diphenyl sulfide.

42. Compounds depictable by the formula $(R'')_nB_{10}H_{10}(CRCR')$
wherein R and R' are each selected from the group consisting of hydrogen, alkyl radicals and monoalkenyl hydrocarbon radicals, the total number of carbon atoms in R and R' being from 0 to 8; R'' is a lower alkyl radical; and $n$ is an integer between 0 and 2, inclusive.

No references cited.

TOBIAS E. LEVOW, Primary Examiner

W. F. W. BELLAMY, Assistant Examiner

U.S. Cl. X.R.

149—22; 44—76